(12) United States Patent
Baldwin et al.

(10) Patent No.: US 7,149,065 B2
(45) Date of Patent: Dec. 12, 2006

(54) SELF TESTING DIGITAL FAULT INTERRUPTER

(75) Inventors: John R. Baldwin, Newtown, CT (US); Nelson Bonilla, West Haven, CT (US); Joseph DeBartolo, Jr., North Stonington, CT (US); David Lutz, Woodbridge, CT (US); Sorin I. Mortun, Irvington, NY (US); Daming Yu, Easton, CT (US)

(73) Assignee: Hubbell Incorporated, Orange, CT (US)

( * ) Notice: Subject to any disclaimer, the term of this patent is extended or adjusted under 35 U.S.C. 154(b) by 392 days.

(21) Appl. No.: 10/461,874

(22) Filed: Jun. 16, 2003

(65) Prior Publication Data

US 2004/0252425 A1    Dec. 16, 2004

(51) Int. Cl.
*H02H 3/16* (2006.01)
(52) U.S. Cl. .......................................... 361/42; 361/44
(58) Field of Classification Search ............ 361/42–50; 324/500, 509; 702/58
See application file for complete search history.

(56) References Cited

U.S. PATENT DOCUMENTS

| | | | | |
|---|---|---|---|---|
| 4,316,229 A | * | 2/1982 | Helwig, Jr. .................. 361/42 |
| 4,518,945 A | * | 5/1985 | Doyle et al. ........... 340/310.18 |
| 4,618,907 A | * | 10/1986 | Leopold ....................... 361/45 |
| 4,710,846 A | * | 12/1987 | Heisinger ................... 361/119 |
| 5,661,623 A | * | 8/1997 | McDonald et al. .......... 361/42 |
| 5,963,405 A | * | 10/1999 | Engel et al. .................. 361/42 |
| 6,111,733 A | * | 8/2000 | Neiger et al. ................. 361/42 |
| 6,421,214 B1 | * | 7/2002 | Packard et al. ................ 361/7 |
| 6,788,504 B1 | * | 9/2004 | Vanderkolk .................. 361/42 |
| 6,807,035 B1 | * | 10/2004 | Baldwin et al. .............. 361/42 |
| 6,807,036 B1 | * | 10/2004 | Baldwin ...................... 361/42 |

* cited by examiner

*Primary Examiner*—Brian Sircus
*Assistant Examiner*—Danny Nguyen
(74) *Attorney, Agent, or Firm*—Alfred N. Goodman; Mark S. Bicks; Raymond B. Persino

(57) ABSTRACT

A fault interrupter apparatus having a line side and a load side and a conductive path there between. The apparatus includes a solenoid that is adapted to move a plurality of contacts disposed in the conductive path from a first position to a second position, an alarm indicator that is adapted to provide status information on the operation of the fault interrupter apparatus, and a processor that is adapted to detect four condition states of the fault interrupter and indicate the four condition states of the fault interrupter using the alarm indicator.

24 Claims, 14 Drawing Sheets

SELF TESTING DIGITAL FAULT INTERRUPTER

CROSS-REFERENCE TO RELATED APPLICATION

Related subject matter is disclosed in U.S. Non-provisional Patent Application of John R. Baldwin et al., filed on Nov. 28, 2000, Ser. No. 09/722,423, entitled "Fault Interrupter Using Microprocessor for Fault Sensing and Automatic Self-Testing", and in U.S. Non-provisional Patent Application of John R. Baldwin, filed on Mar. 4, 2002, Ser. No. 10/087,125, entitled "Digital Fault Interrupter With Self-Testing Capabilities", the entire content of said applications being incorporated herein by reference.

FIELD OF THE INVENTION

The present invention relates generally to a self testing fault interrupting device, such as a ground fault circuit interrupter or an arc fault circuit interrupter. More particularly, the present invention relates to a self testing fault interrupting device where the self test is performed independent of a manual test.

BACKGROUND OF THE INVENTION

Fault interrupting devices are designed to trip in response to the detection of a fault condition at an AC load. The fault condition can result when a person comes into contact with the line side of the AC load and an earth ground, a situation which can result in serious injury. A ground fault circuit interrupter (GFCI) detects this condition by using a sense transformer to detect an imbalance between the currents flowing in the line and neutral conductors of the AC supply, as will occur when some of the current on the line side is being diverted to ground. When such an imbalance is detected, a relay or circuit breaker within the GFCI device is immediately tripped to an open condition, thereby removing all power from the load.

Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the required threshold level of differential current when a line-to-ground fault occurs.

A ground fault is not the only class of potentially dangerous abnormal operating conditions. Another type of undesirable operating condition occurs when an electrical spark jumps between two conductors or from one conductor to ground also known as an arcing path. This spark represents an electrical discharge through the air and is objectionable because heat is produced as an unintentional by-product of the arcing. Such arcing faults are a leading cause of electrical fires.

Arcing faults can occur in the same places that ground faults occur; in fact, a ground fault would be called an arcing fault if it resulted in an electrical discharge, or spark, across an air gap. A device known as an arc fault circuit interrupter (AFCI) can prevent many classes of arcing faults. Both GFCIs and AFCIs are referred to as fault protection devices.

Conventional self testing fault protection devices typically provide a self test which replaces a user having to perform manually tests at fixed periods of time, for example, weekly, monthly, and so on. Because the user relies on the self testing fault protection device to perform self tests, the user may have a false sense of security. For example, many self testing fault protection devices only test for the opening and closing of contacts of the self testing fault protection device during the required fixed periods of time. If there is a defect with a component other than the contacts or a defect with another component prior to the fixed period of testing, a user can believe that the device is providing fault protection and can inadvertently be injured.

Also, as a solenoid of a fault protection device is operated over time, the semiconductor that is used to operate the solenoid can become degraded to a point where it approaches failure. This occurs because a 500 volt transient is placed across the transistor every time the solenoid is deenergized. Many manufacturers of fault protection devices place a diode between the solenoid and transistor. The diode is referred to as a suppressor diode. However, placing a suppressor diode between the solenoid and transistor significantly lengthens the time to open contacts to break a conductive path. United Laboratories (UL) requirements allow for a maximum time period within which the load must be disconnected from the power supply in the event of a ground fault or arc fault. Since a life may be involved, time is of the essence regarding quickly opening the contacts of the fault protection device.

Another problem with conventional fault protection devices is that their load or feed-through terminals are hard wired to the face receptacles of the GFCI and AFCI. Therefore, if a user miswires the GFCI or AFCI by connecting the hot and neutral lines to the load terminals, equipment plugged into the GFCI or AFCI via the face receptacles, the face receptacles can still be powered even if the GFCI or AFCI is in a tripped or off state. This can lead to potential injury to the user because the user would be under the impression that the GFCI or AFCI in a tripped condition always provides protection.

Still another problem with conventional fault protection devices is electrical sparks associated with the input power line sometimes occur when the contacts of the protection device close. The high temperatures associated with the electrical sparks sometimes melt the plastic housing of the protection device. Current solutions such as making the walls of the protection device thicker are not cost effective.

Yet another problem with conventional fault protection devices is that users are not adequately aware of the operational status of the GFCI. For example, in a typical fault protection device, there is a two-state alarm indication device. The two-state alarm indication device usually indicates that the fault protection device is in one of two states—operational or nonoperational. However, there may be situations where the fault protection device is functioning in a third-state. For example, there are situations where the fault protection device is operating as a normal receptacle. That is, the fault protection device no longer provides fault protection. However, a user may be content to operate the fault protection device in this mode. A third state serves as a constant reminder to the user of the status of the fault protection device. Conventional fault protection devices presently do not indicate the third-state.

Therefore a need also exists for a self testing fault protection device that does not simply test the contacts of the GFCI and AFCI at fixed time periods, but other components as well prior to the fixed time periods for testing the contacts.

There is a further need for a fault protection device which allows for a quick response in opening the contacts of the fault protection device without damaging the transistor or adding a delay in responding to a fault condition.

Still yet another need exists for a fault protection device that has face receptacles that are isolated from the load terminals.

Still another need exists for a fault protection device that allows the fault protection device to self test without providing a momentary interruption in power to current sensitive equipment.

Another need exists for a fault protection device that provides a tri-state alarm indication.

A further need exists for a structural housing that is resistant to burning or melting from the high temperatures related to electrical sparks. The structure should also provide an arrangement that maximizes space on a printed circuit board.

SUMMARY OF THE INVENTION

One aspect of the present invention provides a fault interrupter apparatus having a line side and a load side and a conductive path therebetween. The apparatus includes a solenoid that is adapted to move a plurality of contacts disposed in the conductive path from a first position to a second position, an alarm indicator that is adapted to provide status information on the operation of the fault interrupter apparatus, and a processor that is adapted to detect four condition states of the fault interrupter and indicate the four condition states of the fault interrupter using the alarm indicator.

Another aspect of the present invention provides a fault interrupter apparatus having a line terminals and load terminals and a conductive path therebetween. The apparatus comprises a fault sensing transformer that is adapted to detect a fault condition in the conductive path, a solenoid that is adapted to move a plurality of contacts disposed in the conductive path from a first position when the solenoid is deenergized or to a second position when the solenoid is energized, a switch that is adapted to place said solenoid in the energized state in the absence of the fault condition and in the deenergized state in the presence of the fault condition, and a varistor that is adapted to protect said switch from transient voltage when the solenoid goes from the energized state.

BRIEF DESCRIPTION OF THE DRAWINGS

These and other aspects, advantages and novel features of the invention will be more readily appreciated from the following detailed description when read in conjunction with the accompanying drawings, in which.

DETAILED DESCRIPTION OF THE PREFERRED EMBODIMENT

Figure 1:
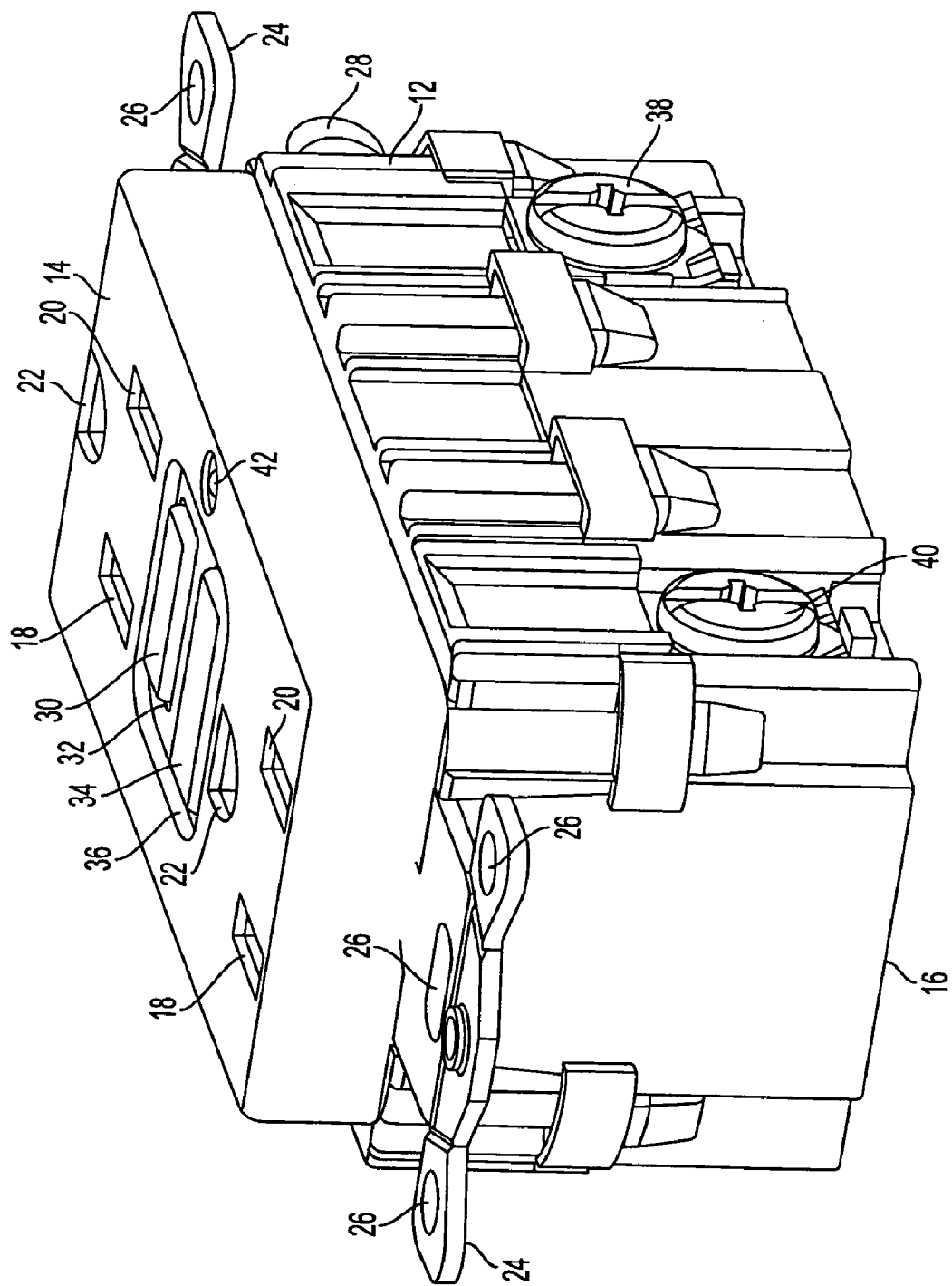
FIG. 1 is a perspective view of an example of a ground fault circuit interrupting (GFCI) device in accordance with an embodiment of the present invention.
Figure 12:
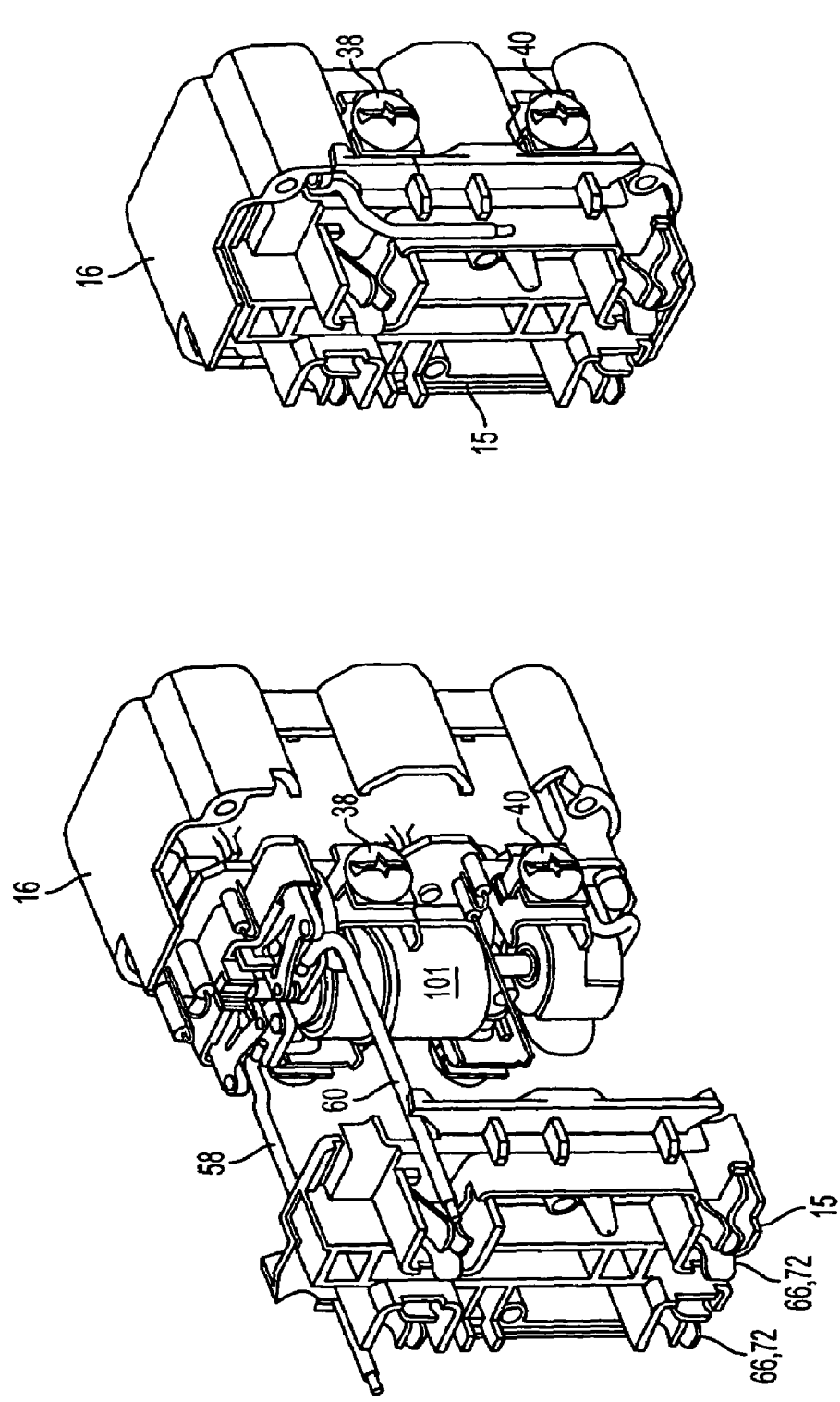

FIG. 1 is a perspective view of an example of a fault indication and protection circuit 10 in accordance with an embodiment of the present invention. The fault indication and protection circuit 10 can be a ground fault circuit interrupter (GFCI), an arc fault circuit interrupter (AFCI) and/or perform the functions of both an AFCI and GFCI. However, for purposes of illustration, the fault indication and protection circuit 10 will be described as a GFCI device 10. The GFCI device 10 comprises a housing 12 having a cover portion 14 and a rear portion 16. The GFCI device 10 also includes a barrier between the cover portion 14 and the rear portion (See FIGS. 12 and 13) when the cover portion 14 is removed from the rear portion 16. The cover portion 14 and rear portion are removably secured to each other via fastening means such as clips, screws, brackets, tabs and the like. The cover portion includes face receptacles (also known as plugin slots) 18 and 20 and grounding receptacles 22. It will be appreciated by those skilled in the art that face receptacles 18 and 20 and grounding receptacles 22 can accommodate polarized, non-polarized, grounded or non-grounded blades of a male plug. The male plug can be a two wire or three wire plug without departing from the scope of the present invention. The GFCI device 10 further includes mounting strap 24 having mounting holes 26 for mounting the GFCI receptacle 10 to a junction box (not shown). At the rear wall of the housing 12 is a grounding screw 28 for connecting a ground conductor (not shown).

A test button 30 extends through opening 32 in the cover portion 14 of the housing 12. The test button is used to activate a test operation that tests the operation of the circuit interrupting portion disposed in the GFCI device 10. The circuit interrupting portion, to be described in more detail below, is used to break electrical continuity in one or conductive paths between the line and load side of the GFCI device 10. A reset button 34 extends through opening 36 in the cover portion 14 of the housing 12. The reset button 34 is used to activate a reset operation, which reestablishes electrical continuity in the open conductive paths.

Rear portion 16 has four screws, only two of which are shown in FIG. 1. Load terminal screw 38 is connected to a neutral conductor and a load terminal screw 37 (See FIG. 4) is connected to the hot conductor. Line terminal screw 40 is connected to the neutral conductor and a line terminal screw 39 (See FIG. 4) is connected to the hot conductor. It will be appreciated by those skilled in the art that the GFCI receptacle 10 can also include apertures proximate the line and load terminal screws 37, 38, 39 and 40 to receive the bare end of conductors rather than connecting the bare end of the wires to the line and load terminal screws.

GFCI device 10 also has an alarm indicator 42 for providing an indication to a user that GFCI device 10 is operating normally, the conductive path between the line and load terminals is open, or the GFCI device 10 is operating as a receptacle without fault protection.

Alarm indicator 42 comprises a bi-color light emitting diode (LED), which provides a first color when a first chip is activated, a second color when a second chip is activated, and in accordance with an embodiment of the present invention, a third color when both chips are activated. As discussed in more detail below, an embodiment of the present invention, the alarm indicator 42 illuminates to provide a green color when the GFCI device 10 is operating normally and providing GFCI protection, illuminates red when the conductive path between the line and load terminals is open, and illuminates solid green and flashing red color when the GFCI device 10 is operating as a normal receptacle and not providing ground fault protection. When the alarm indicator 42 is solid green and flashing red, a third color, orange, results when red and green are illuminated simultaneously. It should be appreciated by those skilled in the art that although the alarm indicator is described as being a dual chip LED, two separate single LEDs, a single LED having a single filament, or a buzzer can be used to provide an alarm indication without departing from the scope of the present invention. In addition, two separate lamps or a bicolored lamp can be used. If a single LED or lamp is used, the LED or lamp can have different flash rates to provide various status indications to a user.

Figure 2:
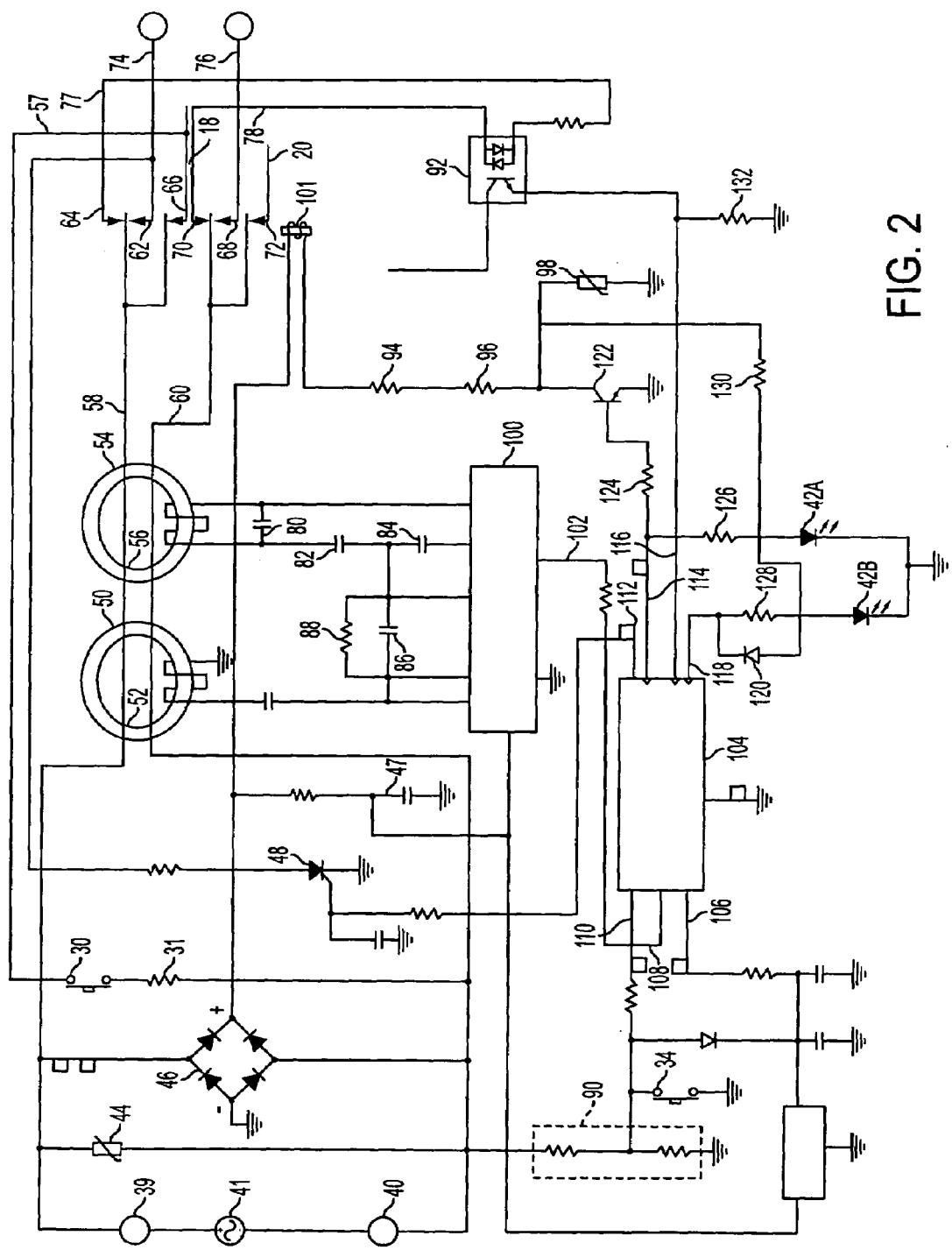
FIG. 2 is a schematic diagram of a ground fault circuit interrupter in accordance with an embodiment of the present invention, in which a conventional GFCI chip is employed in combination with a microprocessor to operate the GFCI.

FIG. 2 is a schematic diagram of a ground fault circuit interrupter in accordance with a first embodiment of the present invention, in which a conventional GFCI chip is employed in combination with a microprocessor to operate the GFCI. The GFCI device 10 employs a GFCI chip 100 with an output 102 to a microprocessor 104. Microprocessor 104 is preferably a Type PIC12F629 or PIC12F675 microprocessor manufactured by Microchip, located in Chandler, Ariz. A transistor 122 is powered, via the microprocessor 104, to energize solenoid 101, thus closing contacts 62, 66, 68 and 72 to establish a conductive path between line terminals 39 and 40 and faceplate receptacles 18 and 20 and load or feedthrough terminals 37 and 38.

In an embodiment of the present invention, the PIC12F675 microprocessor 104 is used where there is a need for a I/O port to accept more than one condition. For example, as an option, the test button 30 and reset button 34 can share an I/O port. A voltage divider can be used to distinguish whether the test or reset button was pressed. Another option would be to eliminate test button 30 and use reset button 34 as a test/reset button. For example, microprocessor 104 would distinguish a first press of the button as being a test and a second press of the button as being a reset.

The GFCI device 10 employs three sets of contacts, namely contacts 62 and 68, 64 and 70, and 66 and 72. Contact 62 establishes electrical continuity between line terminal 39 and load terminal 37 via hot conductor 58 and path 74. Contact 68 establishes electrical continuity between line terminal 40 and load terminal 38 via neutral conductor 60 and path 76. Contacts 66 and 72 establish electrical continuity between the line terminals 39 and 40 and face terminals 18 and 20 via hot conductor 58 and neutral conductor 60, respectively. The isolation of contacts 66 and 72 from the load terminals 37 and 38 prevent the face terminals 18 and 20 from being powered if the GFCI device 10 is mistakenly wired so that power source 41 is connected to the load terminals 37 and 38. It should be noted that GFCI device 10 is structured and arranged to permit the electronics of the circuit to only be powered when the GFCI device 10 is wired from the line terminals 39 and 40 via a power source. If a power source 41 is connected to the load terminals 37 and 38, the electronics of the GFCI device 10 cannot be powered to close contacts 62 and 68, which are driven closed by energization of the solenoid 101. Before power is applied contacts 62 and 68 are open, and contacts 64 and 70 are closed. As discussed in more detail below, opto-isolator 92 detects when contacts 64 and 70 are closed by detecting current from the line side on hot conductor 58 and neutral conductor 60 via conductors 77 and 78. It should be noted that contacts 62 and 68 are the primary contacts, which close the connection between the line and load terminals. Contacts 64 and 70 are the auxiliary contacts, which provide an indication to opto-isolater 92 that contacts 62 and 68 are open. In operation, when the primary contacts 62 and 68 are closed, the auxiliary contacts are open and vice versa. This function can be performed by a single pole double throw switch, for example.

The contacts 62 and 68 and 66 and 72 are opened and closed simultaneously by a solenoid 101 preferably having specifications as detailed in TABLE 1 below. A suitable solenoid 101 is available from Bicron Electronics located in Canaan, Conn. having a footprint of about 0.650 square inch, an aspect ratio of about 1.500, and dimensions of about 0.650 inch in height, 0.650 inch in width, and 1.00 inch in length. It should be appreciated by those skilled in the art that the subject invention is not limited to the types of solenoids mentioned, alternate types of solenoids can be substituted without departing from the scope of the present invention.

TABLE 1

EXAMPLE OF RELAY SPECIFICATIONS

| | |
|---|---|
| Total time for Contacts to open and re-close | 16.7 msec. |
| Holding Force in Fully Pulled-In Position (dm = 0–.010) | 1.75 lbs. minimum |
| Initial Pull Force when First Energized (d = .050–.060) | 0.15 lbs. minimum |
| Stroke | >.060" |
| Ambient Temperature | −35° C. to 66° C. |
| Required PC Board Area | 1.00" by 0.65" max. |
| Coil Hot Spot Temperature | Less than 95° C. at 25° C. ambient |
| Coil Operation | Normal operation is continuously on; powered by a full wave rectified 120 VAC signal (+10%–15%) |

The detection of a ground fault condition at a load connected to one of the face receptacles 18, 20 or to the load terminals 37 and 38, is implemented by a current sense transformer 54, the GFCI chip 100 which has a direct input into the microprocessor 104 via line 102, as well as other interconnecting components. The GFCI chip 100 is preferably a Type RV4145N integrated circuit manufactured by Fairchild Semiconductor, located in South Portland, Me. The GFCI chip 100 and the microprocessor 104 are powered from the line terminals 39 and 40 by a full-wave bridge rectifier 46 and filter capacitor 47. A transient voltage suppressor 44 is connected across the line terminals 39 and 40 to provide protection from voltage surges due to lightning and other transient conditions. As the transients increase, the voltage suppressor 44 absorbs energy.

Within the GFCI device 10, the hot conductor 58, as mentioned above, connects the line terminal 39 to the load line terminal 37, and neutral conductor 60 connects the line terminal 40 to the load terminal 38, in a conventional manner. The conductors 58 and 60 pass through the magnetic cores 52 and 56 of the two transformers 50 and 54, respectively. The transformer 54 serves as a differential sense transformer for detecting a leakage path between the line side of the AC load and an earth ground (not shown), while the transformer 50 serves as a grounded neutral transformer for detecting a leakage path between the neutral side of the AC load and an earth ground. In the absence of a ground fault, the current flowing through the conductors 58 and 60 are equal and opposite, and no net flux is generated in the core 56 of the differential sense transformer 54. In the event that a connection occurs between the line side of the AC load and ground, however, the current flowing through the conductors 58 and 60 no longer precisely cancel, and a net flux is generated in the core 56 of the differential sense transformer 54. This flux gives rise to a potential at the output of the secondary coil 55, and this output is applied to the input of the GFCI chip 100 to produce a trip signal on the output line 102. As mentioned above, this output is fed directly into the microprocessor 104 via pin 108, which in turn controls the operation of solenoid 101 to open the contacts 62, 66, 68 and 70. This closes contacts 64 and 70 to remove the AC power from the face receptacles 18 and 20 and the load or feedthrough terminals 37 and 38.

Since the GFCI chip 100 is a commercially available component, its operation is well known to those skilled in the art, and need not be described in detail. In utilizing the GFCI chip 100, resistor 88 serves as a feedback resistor for setting the gain of the controller and hence its sensitivity to normal faults. Capacitors 80 and 84 provide noise filtering at the inputs of the controller. Capacitor 82 AC couples low frequency signals out of the sense transformer 54, to the GFCI chip's 100 internal operational amplifier (not shown).

The contacts 62, 66, 68 and 72 are in a closed state while contacts 64 and 70 are in an open state when the solenoid 101 is energized. This state will be referred to as the normal state or close state. However, when the solenoid 101 is not energized, the contacts 62, 66, 68, and 72 are in an open state while contacts 64 and 70 are in a closed state. This state will be referred to as an abnormal or open state.

In operation, a ground fault can occur via a manual or self-test, or an actual ground fault, for example when a person comes into contact with the line side of the AC load and an earth ground at the same time. In a manual test described in more detail below, a user presses test button 30. Test button 30 is connected between the hot conductor 58 and neutral conductor 60. When the test button 30 is pressed, an imbalance is detected by sense transformer 54. Specifically, the current passes through resistor 31, the core 52 of the ground transformer, the core 56 of the sense transformer 54 via the hot conductor 58. However, for the return path bypass conductor 57 is used rather than the neutral conductor 60. Since there is no canceling current in the opposite direction, sense transformer 54 detects the current imbalance. The microprocessor 104 determines the existence of faults via the GFCI chip 100. As discussed above, the GFCI chip 100 detects a fault condition via transformers 50 and 54. GFCI chip 100 communicates the fault condition via a signal to pin 108 of the microprocessor 104 using line out 102. The microprocessor 104 then deenergizes the solenoid 101 via transistor 122. Since the microprocessor 104 has no way of knowing whether a ground fault was triggered by an actual fault or by a manual fault simulated by pressing test button 30, the microprocessor 104 always reacts as if an actual fault condition has occurred.

The microprocessor 104 also does not know whether the actual fault has been removed until a user presses the reset button 34. When the reset button 34 is pressed, an input is provided to pin 110 and the microprocessor 104 closes the contacts. If the fault is still present, the microprocessor 104 will detect the condition via GFCI chip 100 and reopen the contacts immediately as discussed above. If a manual test was performed, the fault will no longer be present and microprocessor 104 will close the contacts and check for the existence of faults. If there are no faults the GFCI device 10 returns to normal operation.

In an embodiment of the present invention, a self test is performed on the fault detection portion of the GFCI device 10. In this example, the self test is preferably performed at 1 minute intervals, but the microprocessor 104 can be programmed to perform testing at any interval of time. During the self test the microprocessor 104 communicates a signal to the SCR 48, which creates an imbalance similar to that caused by closing test button 30 that is detected by the transformers 50 and 54. The GFCI chip 10 communicates the imbalance to the pin 108 of microprocessor 104 via the line out 102. The microprocessor 104 is aware that it initiated the fault condition and expects to receive the signal from the GFCI chip 100. Therefore, the microprocessor 104 does not control the solenoid to open the contacts 62, 66, 68 and 72. If the microprocessor 104 does not receive the expected signal from the GFCI chip 100, it determines that the fault detection portion of GFCI 10 is defective and activates the red LED 42B in a manner which will be described below. In an embodiment of the invention, at the next one minute interval, the microprocessor 104 drops pin 114 for 200 microseconds to ground. The collector of transistor 122 goes high for 200 microseconds and the microprocessor 104 detects this condition via pin 118. Thus, two portions of the GFCI device 10 is tested. The GFCI chip 100, which detects a fault condition and the transistor which deenergizes the solenoid 101. It should be appreciated that in the one minute test the solenoid is not deenergized. Rather, the transistor 122 is tested and the voltage at the collector of the transistor is detected via pin 118. If the correct conditions are detected at the collector and/or the resistance of the solenoid is within parameters, it is assumed that the solenoid 101 is operational. It should further be appreciated by those skilled in the art that the two portions of the one minute test can be performed separately via separate one minute tests or can be performed as one test within a one minute time interval.

In another embodiment of the present invention, a self test is performed on the circuit interruption portion of the GFCI device 10. This self test is preferably performed at daily intervals, but the microprocessor 104 can be controlled to perform this test at any desired interval. During testing, the microprocessor 104 communicates a signal to the SCR 48, which creates an imbalance in the transformers 50 and 54. The GFCI chip 10 communicates the imbalance to the pin 108 of microprocessor 104 via the line out 102. The microprocessor 104 then deenergizes the contacts 62, 68, 66 and 72 via pin 114. The contacts open and go to the auxiliary contact position 64 and 70. Now, diode current is in the opto-isolater 92. The opto-isolator 92 puts out a signal across resistor 132 into pin 116 of the microprocessor 104. The opto-isolater 92 signals the microprocessor 104 that the contacts 62, 68, 66 and 72 are open, and that contacts 64 and 70 are closed. The microprocessor 104 opens the contacts 62, 68, 66 and 72 momentarily (preferably for a period of time not to exceed 20 msec.), in order to avoid disrupting the load during the daily self test.

In an embodiment of the present invention, if the GFCI device 10 determines that the one minute periodic test failed, the one minute test can be repeated and if the test failed again, the contacts 62, 68, 66 and 72 can be opened instantly.

In another embodiment of the present invention, when the microprocessor 10 detects the nonfunctioning of GFCI device 10 during either the periodic minute or daily test, the GFCI 10 can be optioned to provide a lockout feature wherein a user cannot reset the contacts of GFCI device 10. However, the lockout feature will not take affect if a manual test was performed.

The automatic daily self-test, mentioned above, is performed on a periodic basis. The microprocessor 104 can maintain a software record of the current state of the contacts 62, 68, 66 and 72 (i.e., either open or closed) and conducts an automatic self-test only if normal operation is in progress with the contacts 62, 68, 66 and 72 being closed. During a self-test, pin 112 is brought high by the microprocessor 104 to drive the SCR 48 gate for 5 msec. Pin 108 looks for a 3.8 ms pulse from the GFCI chip 100. When pin 108 receives a pulse, pin 114 is asserted low by the microprocessor 104 to open the contacts 62, 68, 66 and 72 momentarily. The microprocessor 104 checks pin 116 for a low signal indicating that the contacts 64 and 70 are closed which indicates that contacts 62, 68, 66 and 72 opened for 20 msec and then re-closed. After contacts 62, 68, 66 and 72 open for <20 ms, pin 114 is asserted high and the contacts 62, 68, 66 and 72 re-close.

In an embodiment of the present invention, the microprocessor 104 monitors the AC sinusoidal signal and performs the self test only when the sinusoidal signal is not a zero crossing point. For example, the transistor 122 is driven low when the sinusoidal signal is at its peak.

In another embodiment of the present invention, the microprocessor 104 does not monitor the zero crossing of the sinusoidal signal. Rather, the microprocessor 104 performs two self tests within 4.2 ms apart. This prevents the self test from accepting a false positive caused by the test occurring at a zero crossing point being initiated at a zero crossing point.

In still another embodiment of the present invention, the GFCI device 10 can be optioned by a user to convert from a unit that performs both a daily and one minute periodic test to a unit that only performs a periodic one minute test and vice versa.

The invention will now be described with reference to green LED 42A and red LED alarm indicator 42B both of which comprise alarm indicator 42. During normal operation of the GFCI device 10, the solenoid 101 is energized via pin 114 of the microprocessor 104. This high condition causes the green LED 42A to be illuminated. The red LED 42B is off since it is not powered. Specifically, the voltage applied to the anode of red LED 42B is insufficient to drive red LED 42B.

During a fault condition, the microprocessor 104 detects the fault condition in the manner described above. Pin 114 of the microprocessor goes to ground, thus removing power from the solenoid 101 and causing the green LED 42A to go out. The collector of the transistor 122 rises, and current is provided through resistor 130 which enables a sufficient voltage to appear at the anode of red LED 42B to cause the red LED 42B to illuminate.

In the case where a self test was performed and it was determined that GFCI 10 is nonfunctional, the microprocessor 104 drops the signal on pin 114 to zero which deenergizes the solenoid 101 and turns off the green LED 42A. The collector of the transistor 122 goes high causing the red LED 42B to illuminate as described above. However, since the GFCI device 10 is nonfunctional, the user needs to be aware of this condition. Pin 118 of the microprocessor 104 periodically shunts the red LED 42B anode to ground with diode 120, which causes the red LED 42B to flash.

In the case where it was determined that the GFCT device 10 is nonfunctional, the user has the option of resetting the GFCI device 10 and close the contacts 62, 68, 66 and 72. The red LED 42B continues to flash. The microprocessor 104 detects the pressing of the reset button 34 via pin 110. Pin 114 then goes high, thus energizing the solenoid 101 and illuminating the green LED 42A. Since the red LED 42B continues to flash, a user sees the illuminated green LED 42A when the red LED 42B is off and orange when the red LED 42B and green LED 42A are on simultaneously.

In an embodiment of the present invention, varistor 98 is used across the transistor 122 to protect the transistor from transient voltages that occur when the solenoid 101 is energized or deenergized.

In another embodiment of the present invention, a resistor in series with a diode is placed between solenoid 101 and transistor 122 to reduce the transient voltage on the transistor 122. Specifically, the diode and resistor are sized to obtain optimal balance between reduced transient voltage and increased response time for opening the contacts of the GFCI device 10.

In still another embodiment of the present invention, the transistor's intrinsic collector to emitter breakdown energy handling capability is utilized to provide a GFCI without the need for separate transient voltage protection e.g., a varistor.

Figure 3:
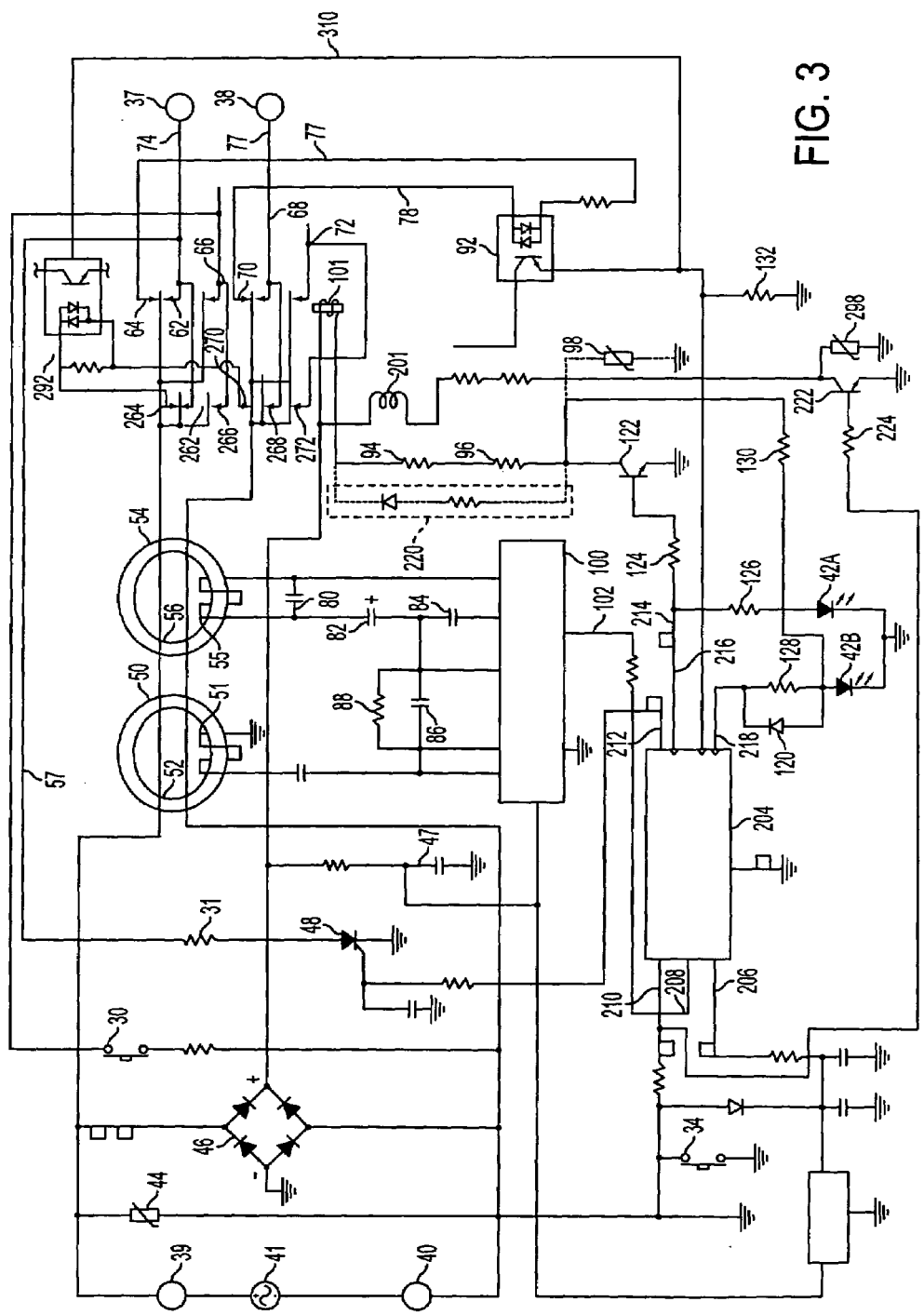
FIG. 3 is a schematic diagram of an example of a ground fault circuit interrupter in accordance with another embodiment of the present invention, similar to the embodiment shown in FIG. 2, but additionally providing redundant contacts for allowing a self test without a power interrupt on the load side of the GFCI.

FIG. 3 is a schematic diagram of a ground fault circuit interrupter in accordance with a second embodiment of the present invention, which is simular to the first embodiment of FIG. 1, but additionally providing redundant contacts for allowing a self test without a power interrupt on the load side of the GFCI. The GFCI device 310 operates in a similar manner to GFCI device 10. Only the differences between the two embodiments will be discussed for conciseness. Redundant contacts 262 and 268, 264 and 270, and 266 and 272 mirror the operation of the primary contacts 62 and 68, 64 and 70, and 66 and 72, respectively. For example, when a primary contact is open, a respective secondary contact should be closed and vice versa.

Referring to GFCI device 310, when a daily self test is performed, the microprocessor 204 communicates a signal to the SCR 48, which creates an imbalance in the transformers 50 and 54. The GFCI chip 100 communicates the imbalance to the pin 208 of microprocessor 204 via the line out 102. The microprocessor 204 then energizes solenoid 201 via pin 210 which closes redundant contacts 262, 266, 268 and 272 providing a secondary path for current between the line and load terminals 39 and 40, and 37 and 38. Opto-isolater 292 detects that contacts 264 and 270 are open and changes the signal level on pin 216 of the microprocessor 204 e.g., a PIC12F675 with analog I/O ports. The microprocessor 204 records this change and continues with the daily self test. Microprocessor 204 provides a signal on pin 214 which deenergizes solenoid 101 which results in contacts 62 and 68, and 66 and 72 being open. Opto-isolater 92 detects the position of contacts 64 and 70 and provides a change in signal level on pin 216 of the microprocessor 204. The microprocessor 204 then communicates a signal via pin 214 which energizes solenoid 101 and closes contacts 62 and 68, and 66 and 72. This causes contacts 64 and 70 to open. Since the opto-isolater 92 removes its contribution to the signal via pin 216, the microprocessor 204 knows that contacts 62 and 68, and 66 and 72 will be re-closed in a few milliseconds. After a few milliseconds of delay, the microprocessor 204 then communicates a signal via pin 216 which causes solenoid 201 to deenergize and open redundant contacts 262, 266, 268 and 272. This closes contacts 264 and 270 which the opto-isolater 292 detects and signals the microprocessor 204 via pin 210. Thus, the primary contacts can be momentarily opened and closed without a user detecting a power interrupt.

It should be appreciated by those skilled in the art that the present invention can be practiced with only one opto-isolater without departing from the scope of the invention. For example, opto-isolater 292 can be omitted and opto-isolater 92 can remain in the circuit to confirm that the primary contacts opened. In addition, microprocessor 204 can be modified to detect the opening and closing of the primary contacts.

In an embodiment of the present invention, a third conductor, connected to SCR 48 passes through the transformers 50 and 56 and provides a path between the hot conductor and the neutral conductor to provide a current imbalance when a self test is performed.

In still another embodiment of the present invention, rather than deenergize the solenoid 101 momentarily during a self test, the energy to the solenoid is increased.

Figure 4:
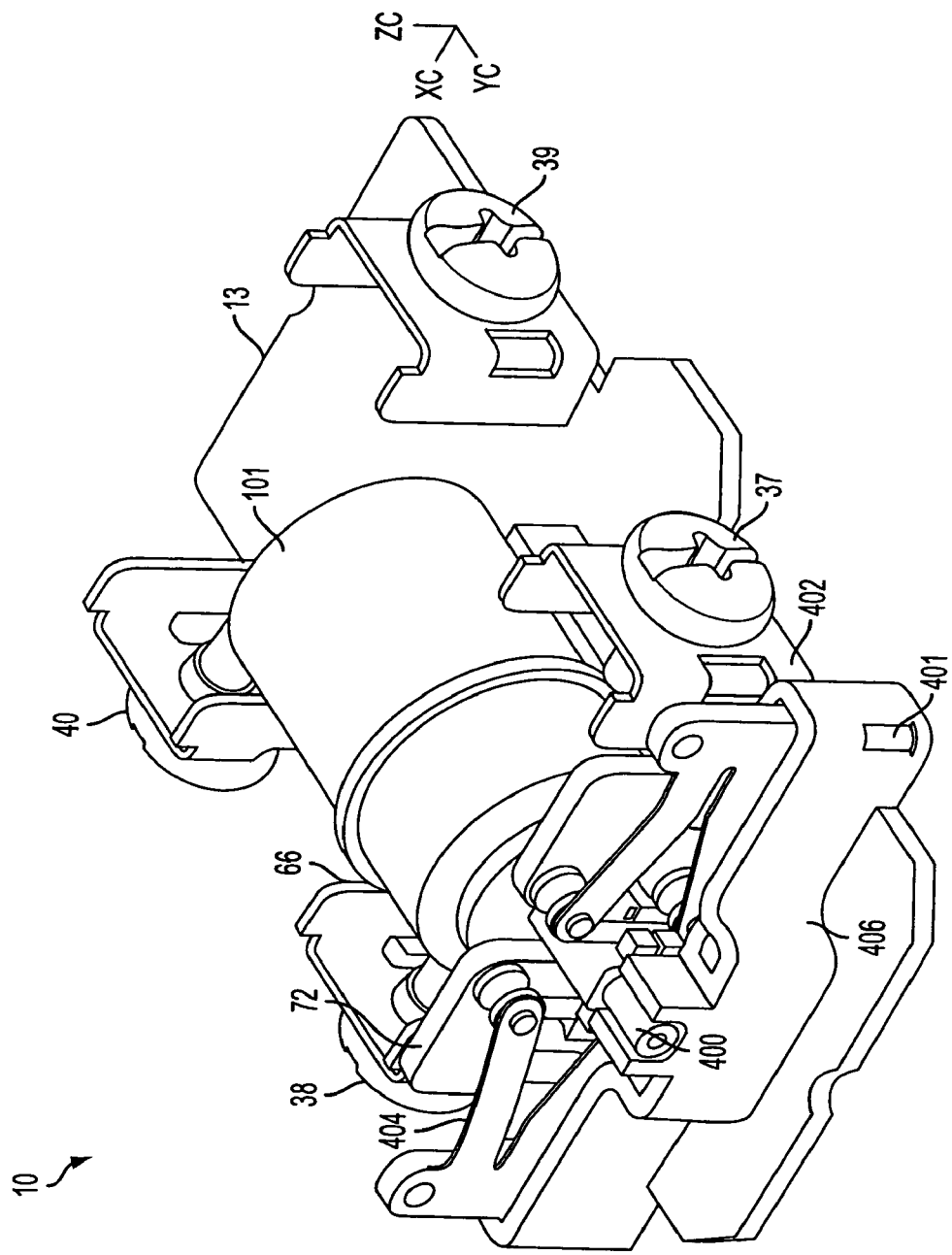
FIG. 4 is a perspective view illustrating components of the ground fault circuit interrupter disposed on the inner housing of the GFCI in accordance with an embodiment of the present invention.
Figure 5:
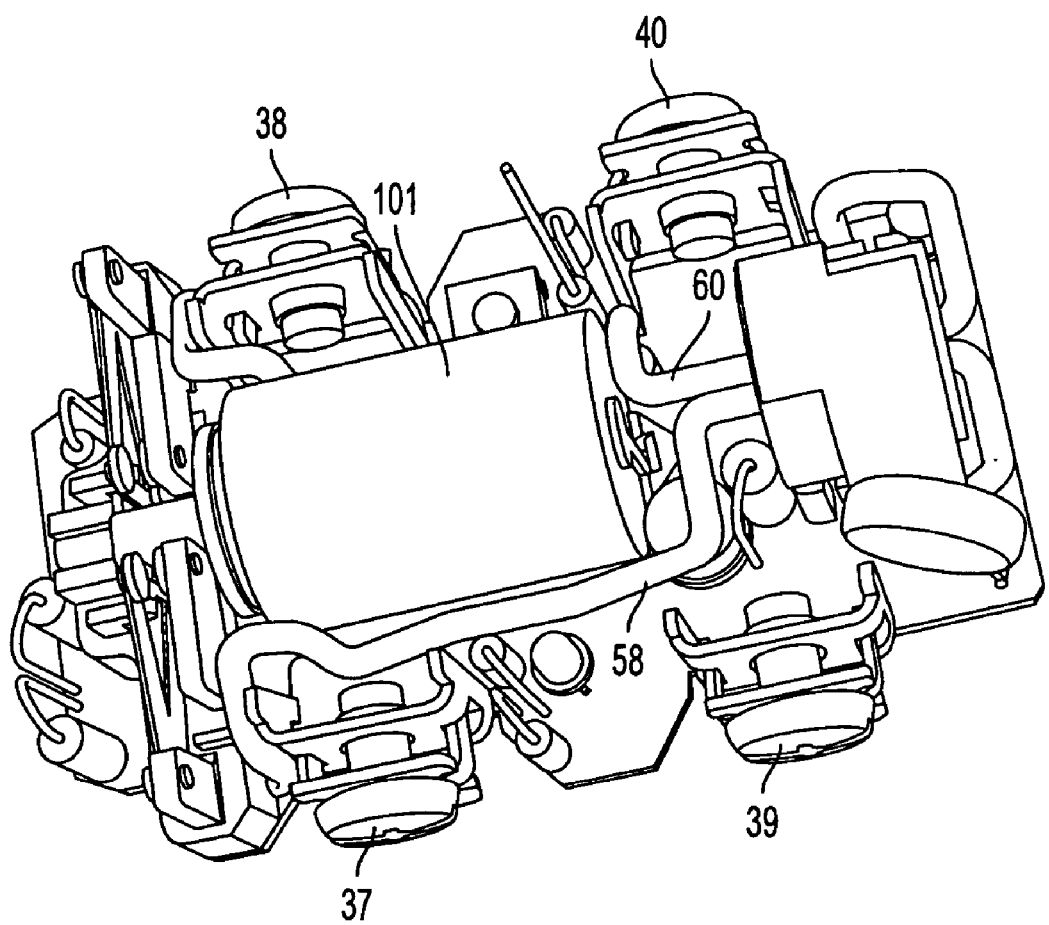
FIGS. 5 to 14 show different perspective views of components of the ground fault circuit interrupter shown in FIG. 4 in accordance with an embodiment of the present invention.

FIG. 4 is a perspective view illustrating components of the ground fault circuit interrupter disposed on the inner housing of the GFCI in accordance with an embodiment of the present invention. The GFCI device 10 of FIG. 4 comprises a printed circuit board 17, line terminals 39 and 40, load terminals 37 and 38, solenoid 101, solenoid plunger 400, supporting walls 401, brush terminal supports 402, brushes 404, and a location for the auxiliary contacts 406. Supporting walls 401 is comprised of a plastic known as Rynite, which is a member of the family comprising Polyethylene Terephtalate. It should be appreciated by those skilled in the art that other plastics comprising the family of plastics known as Polyethylene Terephtalate can be substituted without departing from the scope of the present invention. Rynite provides the housing with structural integrity and high resistance to heat caused by electrical sparks. FIG. 5 shows a top view of the PCB 13 including various components. For example, supporting walls 401 is shown providing structural support to brush terminal supports 402 and contacts 66 and 72. Specifically, contacts 66 and 72 are in an open position.

Figure 6:
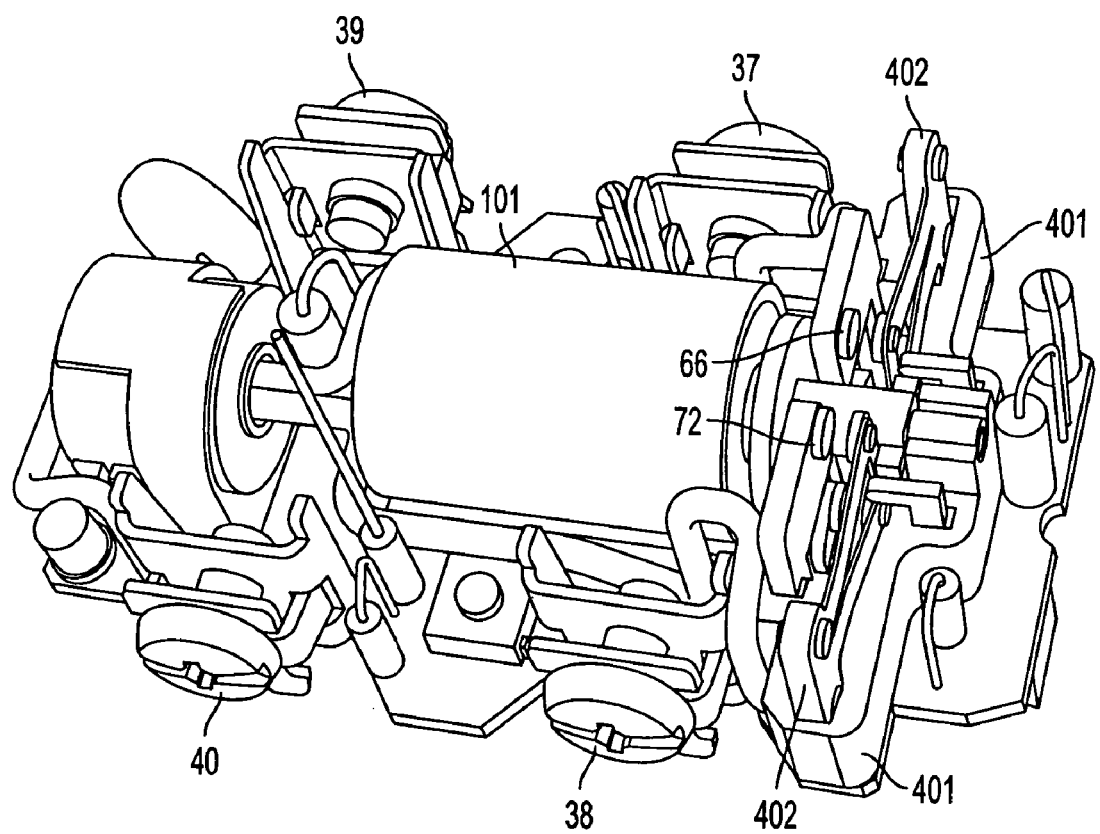
Figure 7:
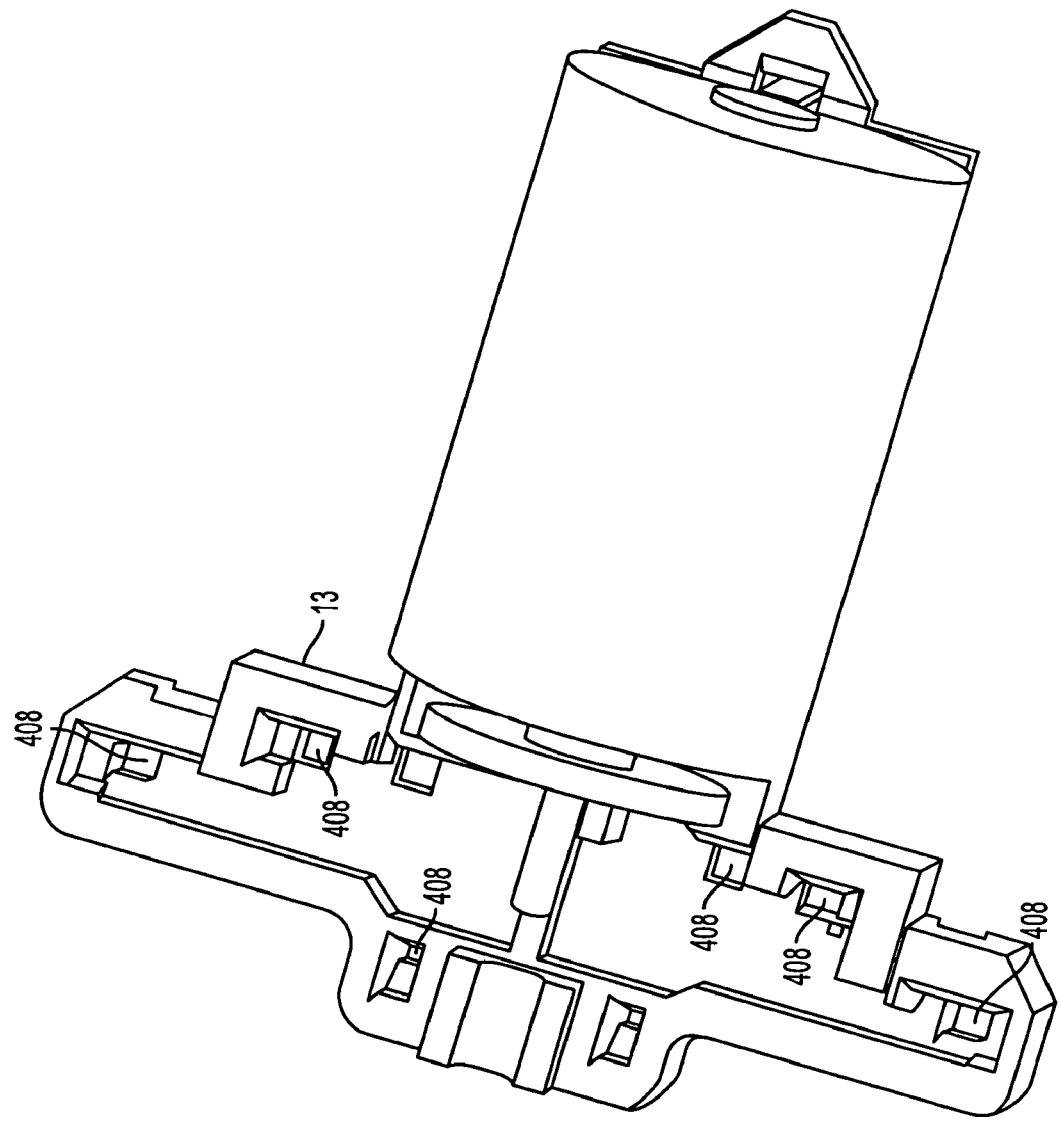
Figure 8:
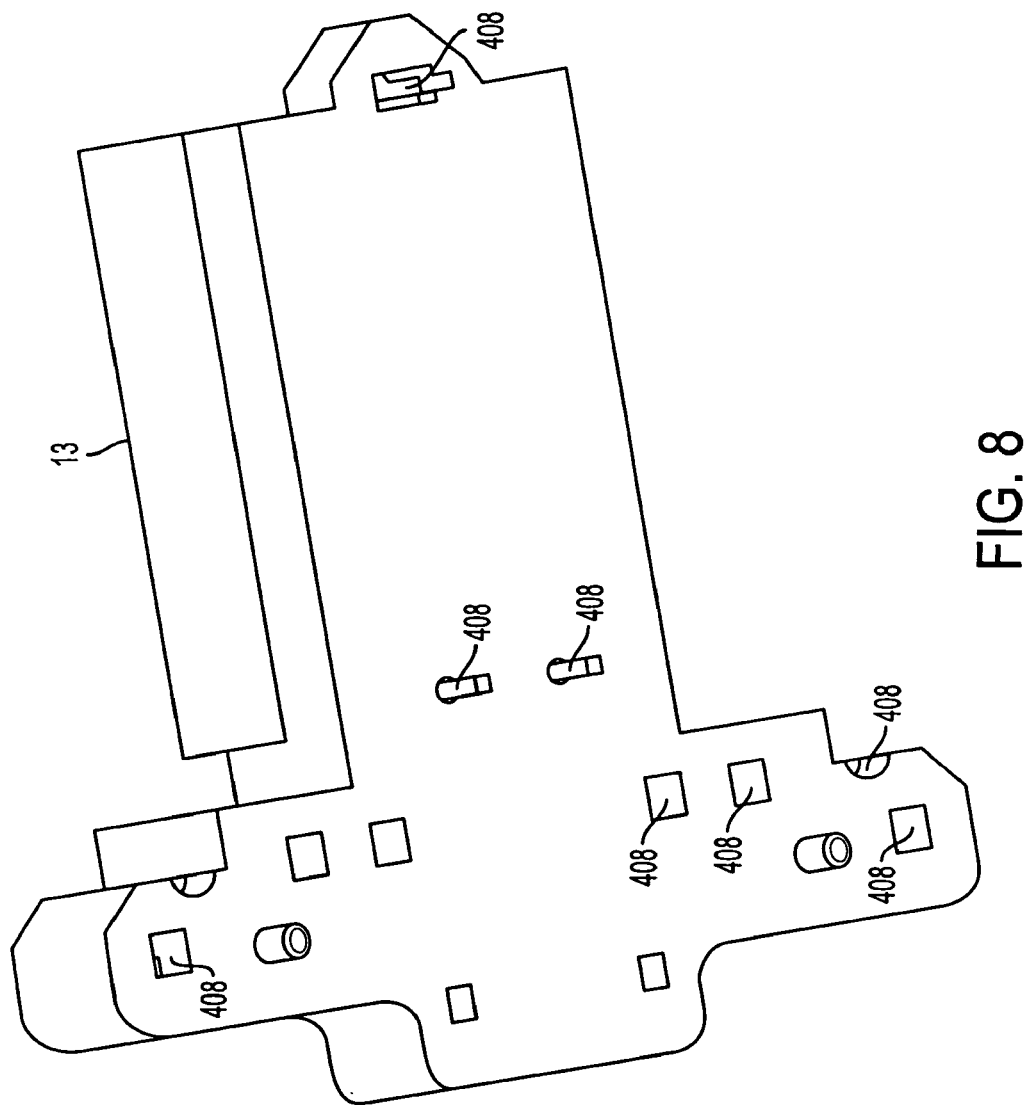
Figure 9:
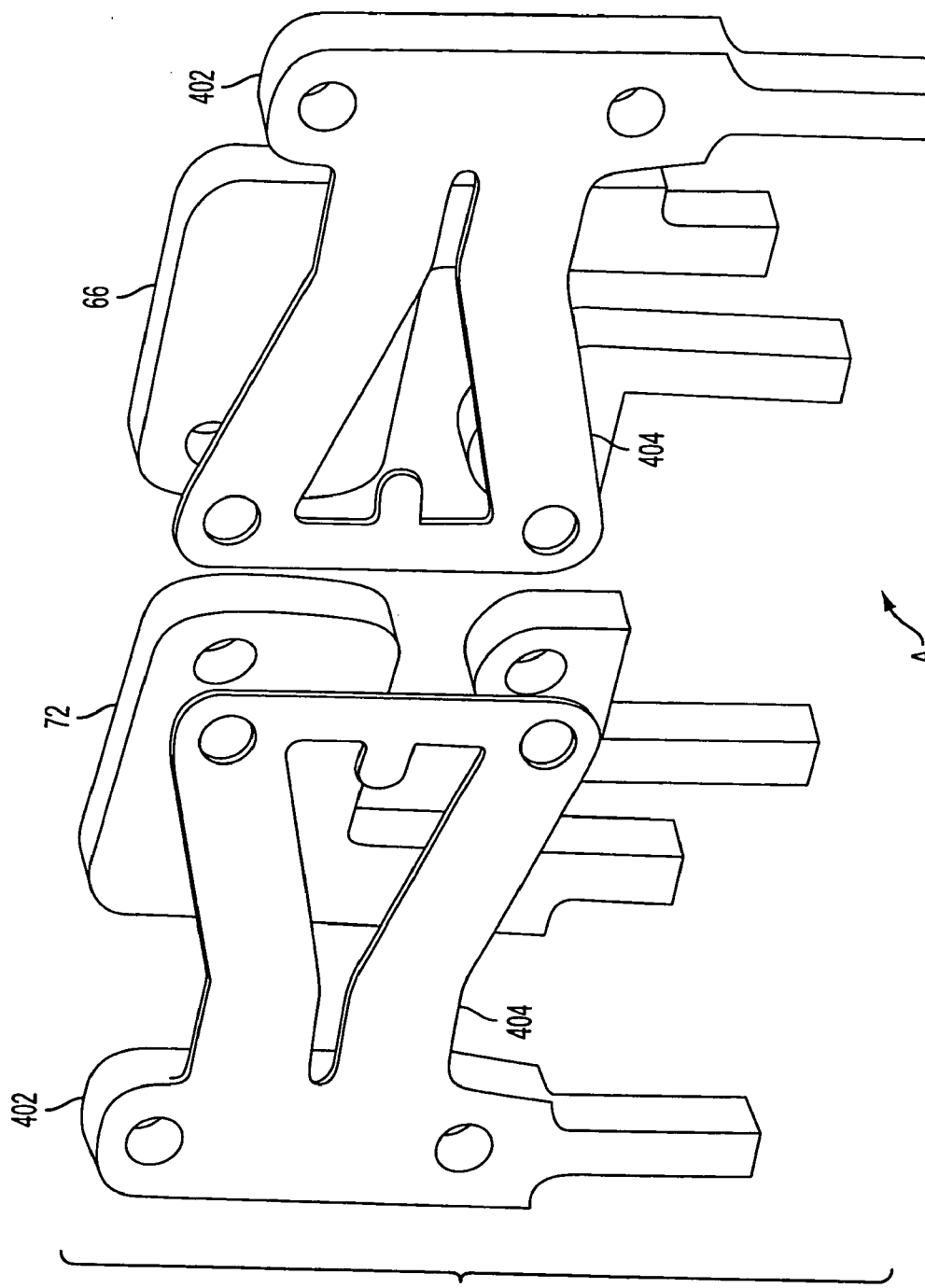
Figure 10:
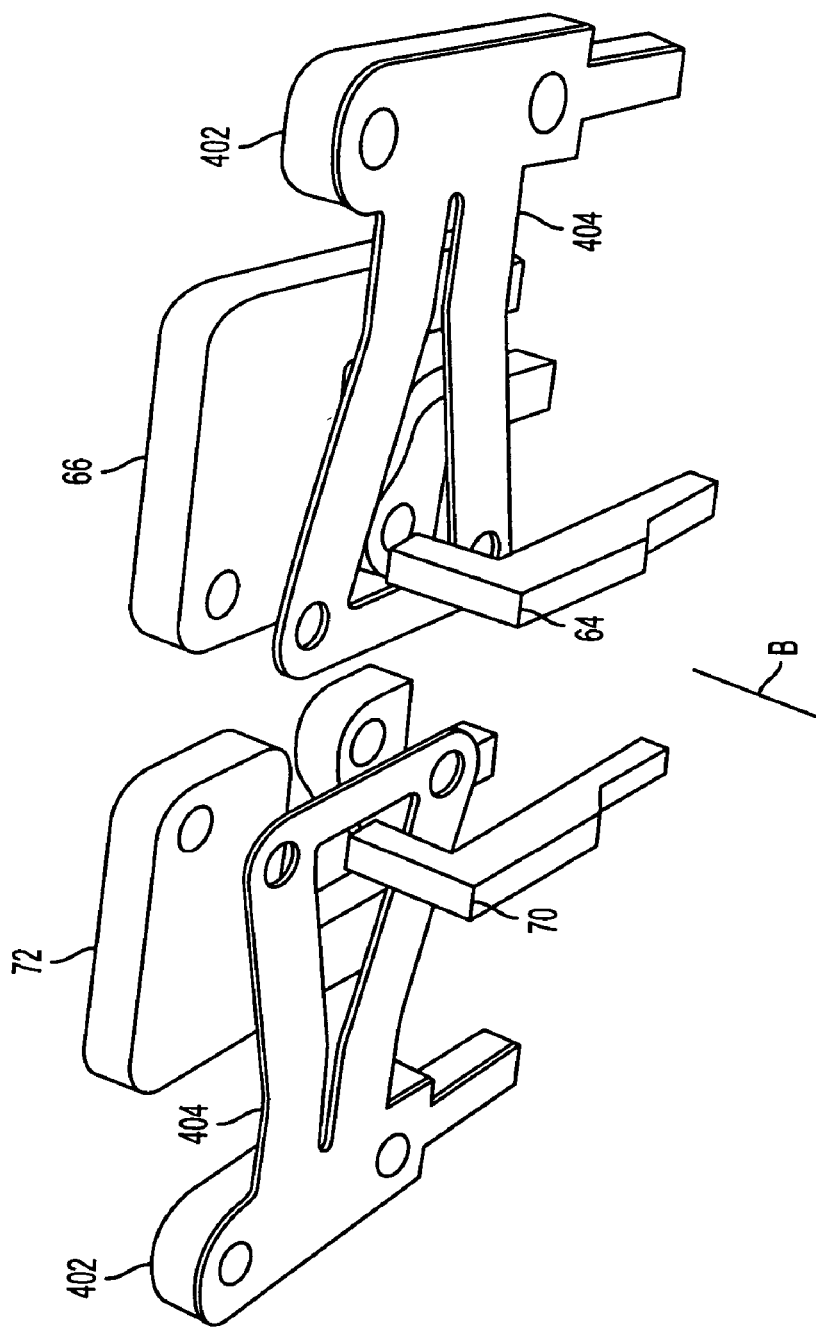
Figure 11:
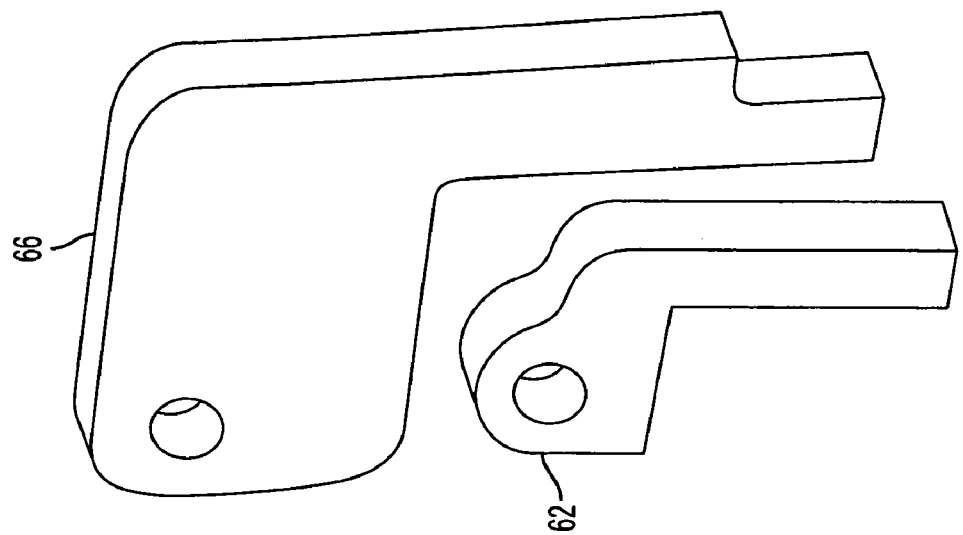
Figure 11:
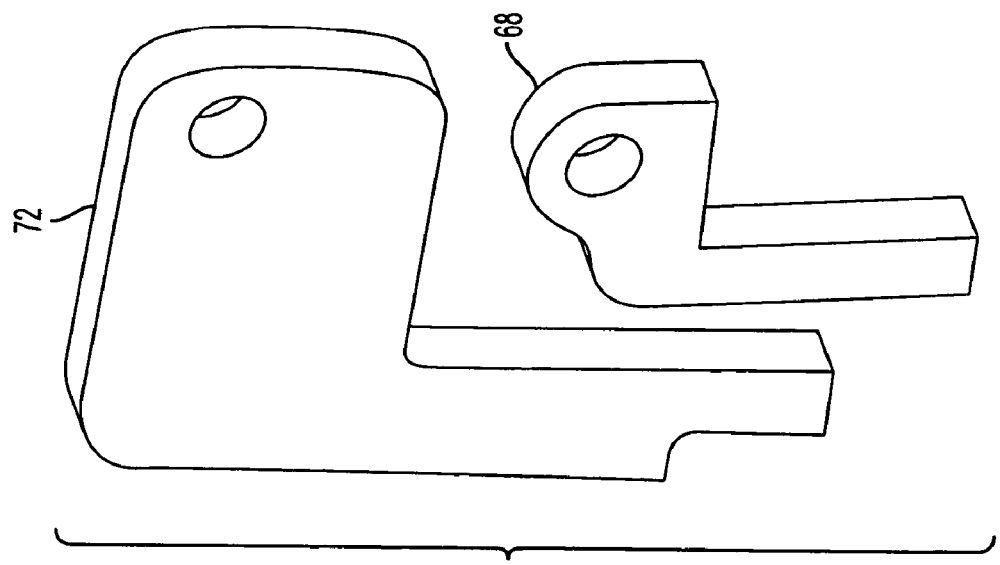

In FIG. 6, a top view of the PCB 13 is also shown. However, supporting walls 401 is not shown. Brush supports 402 and contacts 66 and 72 are shown as being mounted to the PCB 13. FIG. 7 shows a top view of the PCB 13 without any terminals and contacts and FIG. 8 shows the inner housing 13 from a bottom view. FIGS. 7 and 8 both show a plurality of apertures 408 disposed within the inner housing. The spacing of the plurality of apertures allow components such as the brush terminal supports 402, brushes 404, upper walls 401, solenoid 101 solenoid plunger 400, and contacts 62, 64, 66, 68, 70 and 72 to be arranged with precision. For example, when solenoid 101 is energized, the plunger 400 moves in the direction of A bringing the brushes 404 in contact with contacts 62, 68, 66 and 72 as shown in FIG. 9. When the solenoid is deenergized the plunger moves in the direction of B bringing the contacts in contact with contacts 64 and 70 as shown in FIG. 10. Since space on a printed circuit board is limited, there is not a great amount of room for the movement of solenoid 101. However, the arrangement shown in FIG. 4 allows the contacts to make contact with the least amount of distance possible and also be in a position of disengagement with the least amount of space possible. As shown in FIG. 11, the face terminal contacts 66 and 72 are separate from the primary contacts 62 and 68. Thus, if the GFCI device 10 was wired from the load side, the face receptacles 18 and 20 would not be powered. It should be noted that upper walls 401 provide support and guidance for the plunger 400.

Figure 13:
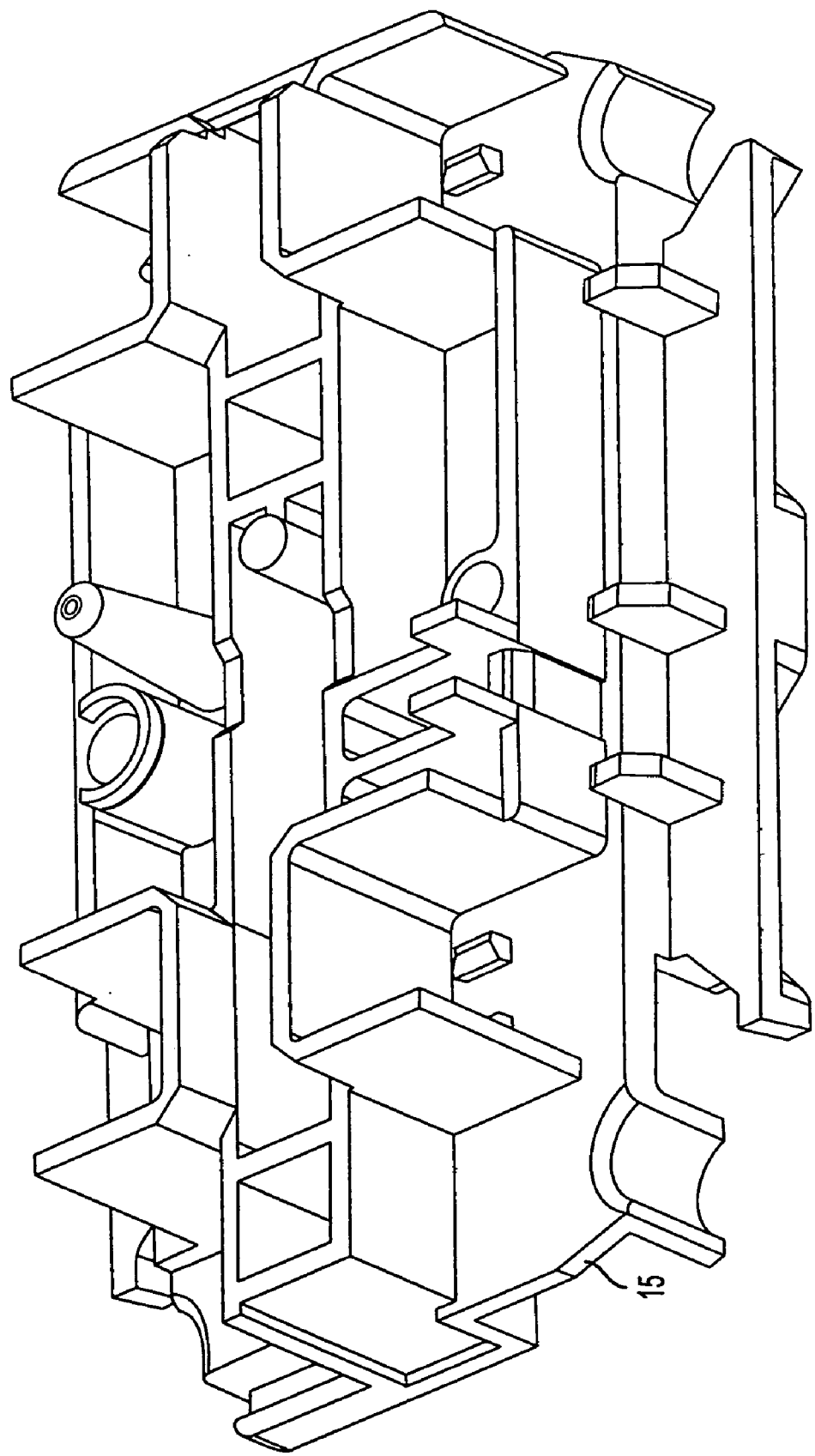
Figure 14:
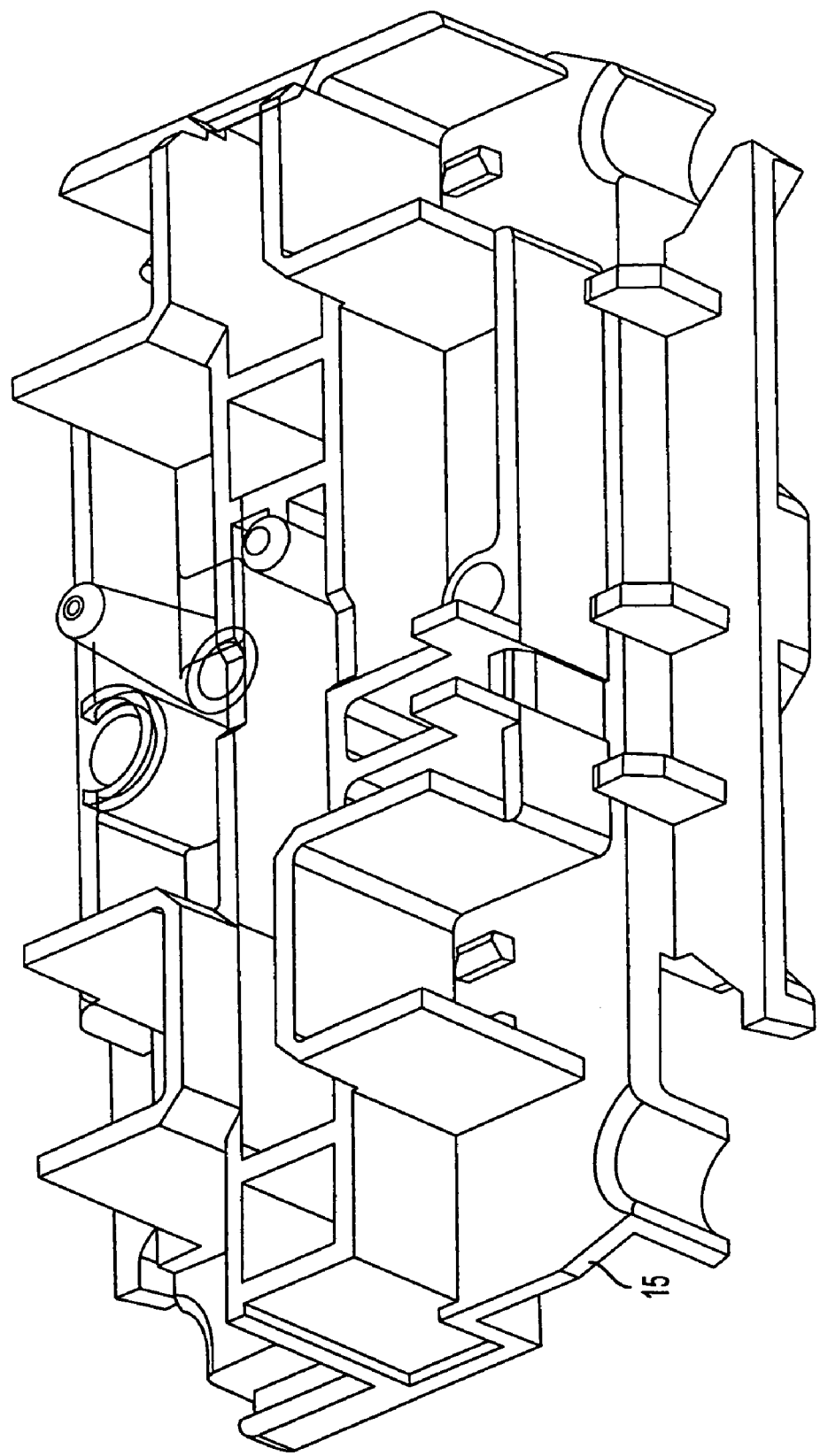

FIG. 12A shows a partially assembled sub-assembly of GFCI device 10. The receptacle barrier 15 and rear portion 16 of the GFCI is shown. Specifically, hot conductor 58 and neutral conductor 60 are shown making contact with face receptacles 18 and 20. The conductors 58 and 60 are ultrasonically welded when the GFCI 10 is being assembled. FIG. 12B shows a completed sub-assembly. Specifically, the receptacle barrier 15 is mounted to the rear portion 16 of the GFCI 10. FIGS. 13 and 14 show detailed views of the receptacle barrier 15.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A fault interrupter apparatus having a line side and a load side and a conductive path therebetween, said apparatus comprising:
   a solenoid, adapted to move a plurality of contacts disposed in said conductive path from a first position to a second position;
   a fault detector for detecting a fault condition;
   an alarm indicator, adapted to provide status information on the operation of said fault interrupter apparatus; and
   a processor programmed to receive an input from the fault detector indicating when a fault is detected and to control operation of the solenoid, said processor being adapted to detect four condition states of said fault interrupter apparatus and indicate said four condition states of said fault interrupter apparatus using said alarm indicator, said four condition states comprising a first condition state wherein said solenoid is operational to allow the fault interrupter apparatus to operate normally as a receptacle and said fault detector is operational to allow ground fault circuit interruption protection, a second condition state wherein a fault is detected and said conductive path is opened via said solenoid, a third condition state wherein said fault detector is determined by a test to be not operational, and a fourth condition state wherein the fault interrupter apparatus is operating normally as a receptacle but said fault detector is not operational.

2. The fault interrupter apparatus of claim 1, wherein said alarm indicator comprises a bi-color light emitting diode (LED).

3. The fault interrupter apparatus of claim 2, wherein said bi-color LED comprises a first color element and a second color element.

4. The fault interrupter apparatus of claim 1, wherein said first position comprises an open position and said second position comprises a closed position.

5. The fault interrupter apparatus of claim 1, wherein said fault detector comprises at least one of an arc fault circuit interrupter and ground fault circuit interrupter.

6. The fault interrupter apparatus of claim 1, further comprising:
   a switch connected to said solenoid and adapted to place said solenoid in one of an energized or deenergized state via a command from said processor.

7. The fault interrupter apparatus of claim 6, further comprising:
   a diode resistor combination disposed between said solenoid and said switch, said diode resistor combination adapted to protect said switch from transient voltage when said solenoid is energized or deenergized.

8. A fault interrupter apparatus having a line side and a load side and a conductive path therebetween, said apparatus comprising:
- a solenoid, adapted to move a plurality of contacts disposed in said conductive path from a first position to a second position;
- an alarm indicator, adapted to provide status information on the operation of said fault interrupter apparatus; and
- a processor, adapted to detect four condition states of said fault interrupter apparatus and indicate said four condition states of said fault interrupter apparatus using said alarm indicator,
- wherein said alarm indication comprises an illumination device having first and second colors, and a relationship between said status information and said four condition states comprises causing illumination of said first color element to indicate a portion of said plurality of contacts is in said first position, causing said second color element to indicate normal operation of said fault interrupter apparatus, causing alternate illumination of said first color element between an off and on state to indicate said fault interrupter apparatus has been detected to be nonfunctioning by said processor, and causing solid illumination of said second color element and alternate illumination of said first color element to indicate said fault interrupter apparatus has been reset and is nonfunctioning.

9. A fault interrupter apparatus having a line side and a load side and a conductive path therebetween, said apparatus comprising:
- a solenoid, adapted to move a plurality of contacts disposed in said conductive path from a first position to a second position;
- a transistor operable, when conductive, to energize said solenoid to close said plurality of contacts and establish said conductive path;
- a fault detector for detecting a fault; and
- a processor programmed to provide a control signal to said transistor, to receive an input from said fault detector, and to operate said transistor via said control signal to de-energize said solenoid and open said plurality of contacts to interrupt said conductive path when a fault is detected;
- wherein said fault interrupter apparatus further comprises a self test fault detection operation that does not de-energize said solenoid during a self test, said processor being programmed to perform said self test fault detection operation by changing the voltage provided on a pin output thereof to a terminal of said transistor for a selected period of time during which the solenoid remains energized, and then determining if the voltage of another terminal of said transistor is within a selected parameter range corresponding to desired operating conditions for said transistor and said solenoid.

10. A fault interrupter apparatus having line terminals and load terminals and a conductive path therebetween, said apparatus comprising:
- a fault detector, adapted to detect a fault condition in said conductive path;
- a solenoid, adapted to move a plurality of primary contacts disposed in said conductive path from a first position when said solenoid is deenergized or to a second position when said solenoid is energized, and to move at least one auxiliary contact connected to at least one of the plurality of primary contacts from the second position when said solenoid is deenergized or to the first position when said solenoid is energized;
- a switch, adapted to place said solenoid in said energized state in the absence of said fault condition and in said deenergized state in the presence of said fault condition;
- a processor programmed to generate a control signal to control said switch, to receive an input from said fault detector, and to operate said switch via said control signal to open said plurality of contacts via said solenoid to interrupt said conductive path when a fault is detected; and
- a varistor, adapted to protect said switch from transient voltage when said solenoid goes from said energized state to said deenergized state or said deenergized state to said energized state;
- wherein said processor is programmed to perform a self test operation by generating a signal to initiate a simulated fault condition, monitoring an input thereof for an indication from said fault detector that said simulated fault condition is detected, controlling said switch via said control signal to operate said solenoid to open said plurality of primary contacts and close said at least one auxiliary contact and to re-close said plurality of primary contacts within a period of time selected to avoid disrupting operation of a load powered via said conductive path, and monitoring said at least one auxiliary contact to confirm momentary opening of said plurality of primary contacts in response to said simulated fault condition.

11. The fault interrupter apparatus of claim 10, wherein said varistor protects said switch without affecting a response time for said plurality of contacts to go from said second position to said first position.

12. The fault interrupter apparatus of claim 10, further comprising:
- an alarm indicator, adapted to indicate a condition of said fault interrupter apparatus.

13. The fault interrupter apparatus of claim 10, wherein said period of time is about 20 milliseconds or less.

14. The fault interrupter apparatus of claim 10, wherein said fault interrupter apparatus comprises at least one of a ground fault detector and an arc fault detector.

15. The fault interrupter apparatus of claim 10, further comprising:
- isolated face receptacles, adapted to be isolated from said load terminals.

16. A self testing fault interrupter apparatus having a conductive path connecting a line side and a load side, comprising:
- a primary pair of contacts in a first position for establishing said conductive path;
- an auxiliary pair of contacts in a second position for monitoring interruption of said conductive path;
- a fault detection processor for detecting a fault condition in said conductive path;
- a microprocessor for performing a first periodic test to determine the operability of the fault detection and processing circuitry and a second periodic test to determine the operability of said primary pair of contacts; and
- a redundant pair of contacts, adapted to be in an open position when said primary pair of contacts is in a closed position and in a closed position when said primary pair of contacts is in an open position.

17. The self testing fault interrupter apparatus of claim 16, further comprising:

an opto-isolater, adapted to communicate a signal to said microprocessor that said auxiliary pair of contacts is in said second position.

18. The self testing fault interrupter apparatus of claim 16, wherein said redundant pair of contacts allow said conductive path to be maintained when said second periodic test is being performed.

19. The self testing fault interrupter apparatus of claim 16, wherein said first test occurs at one minute intervals and said second test occurs at daily intervals.

20. The self testing fault interrupter apparatus of claim 16, wherein said microprocessor can be optioned to perform only the first test or the second test.

21. The self testing fault interrupter apparatus of claim 16, wherein the self testing fault interrupter enters one of a permanent lockout state or resetable non-permanent lockout state based on the failure of said first test or said second test.

22. The self testing fault interrupter apparatus of claim 16, wherein the one minute tests comprises testing said fault detection processor.

23. The self testing fault interrupter apparatus of claim 16, wherein the one minute tests comprises testing a switch and a coil.

24. The self testing fault interrupter apparatus of claim 16, further comprising:
- a front housing, adapted to include face receptacles;
- a back housing, adapted to interlock with said front housing;
- an inner housing, adapted to be comprised of heat resistant plastic comprising polyethylene terephthalate and maintain components of said self testing fault interrupter in a structured arrangement.

* * * * *